US012509015B2

(12) United States Patent
Ding et al.

(10) Patent No.: US 12,509,015 B2
(45) Date of Patent: Dec. 30, 2025

(54) STEERING WHEEL AND METHOD FOR TURNING ON PRESET FUNCTION IN VEHICLE BY USING STEERING WHEEL

(71) Applicant: Autoliv Development AB, Vargarda (SE)

(72) Inventors: Liang Ding, Shanghai (CN); Linlin Xu, Shanghai (CN)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/694,674

(22) PCT Filed: Jun. 28, 2022

(86) PCT No.: PCT/CN2022/101900
§ 371 (c)(1),
(2) Date: Mar. 22, 2024

(87) PCT Pub. No.: WO2023/050937
PCT Pub. Date: Apr. 6, 2023

(65) Prior Publication Data
US 2024/0391411 A1 Nov. 28, 2024

(30) Foreign Application Priority Data
Sep. 29, 2021 (CN) .......................... 202111151518.1

(51) Int. Cl.
*B60R 21/203* (2006.01)
(52) U.S. Cl.
CPC .............................. *B60R 21/2037* (2013.01)

(58) Field of Classification Search
CPC ... B60R 21/2037; B60R 21/203; B60R 16/02; B60R 21/21658; B60W 2050/143;
(Continued)

(56) References Cited

U.S. PATENT DOCUMENTS 5,303,952 A * 4/1994 Shermetaro .......... B60Q 1/0082
200/61.55
2003/0155752 A1 * 8/2003 Xu ........................ B60Q 5/003
280/731
(Continued)

FOREIGN PATENT DOCUMENTS

CN 106502555 A 3/2017
CN 109131529 A 1/2019
(Continued)

*Primary Examiner* — Karen Beck
(74) *Attorney, Agent, or Firm* — Matthew D. Thayne; Thayne and Davis LLC (57) ABSTRACT

A steering wheel, including a cover, a safety airbag, and a frame, the safety airbag being accommodated in a space defined by the cover and the frame and being fixedly mounted on the frame, and the cover being connected to the frame in a suspended manner. The cover is a unitary structure, and is divided into a first functional region, a second functional region, and a third functional region. Surfaces of the first functional region and the third functional region are both provided with a touch film. At least three non-collinear force sensors are further provided in the space. Some of the force sensors are arranged to be opposite the first functional region, and the rest are arranged to be opposite the third functional region. A controller is further included. Also provided is a method for enabling a preset function in a vehicle by using a steering wheel.

11 Claims, 4 Drawing Sheets

(58) Field of Classification Search
CPC ........... B60W 2050/146; B60W 50/14; B60W 50/16; B60K 35/10; B62D 1/046
See application file for complete search history.

(56) References Cited

U.S. PATENT DOCUMENTS

| | | | |
|---|---|---|---|
| 2020/0017057 A1* | 1/2020 | Hirota | B60R 21/2037 |
| 2020/0039559 A1* | 2/2020 | Aerts | B60R 16/0231 |
| 2024/0217470 A1* | 7/2024 | Liu | B60Q 1/0082 |

FOREIGN PATENT DOCUMENTS

| | | |
|---|---|---|
| CN | 110294009 A | 10/2019 |
| CN | 111994093 A | 11/2020 |

* cited by examiner

STEERING WHEEL AND METHOD FOR TURNING ON PRESET FUNCTION IN VEHICLE BY USING STEERING WHEEL

TECHNICAL FIELD

The present invention relates to accessories of a vehicle, and relates in particular to a steering wheel and a method for enabling a preset function in a vehicle by using a steering wheel.

BACKGROUND

With the rapid development of vehicle technology, the intelligence of vehicles has become an important direction of development. Functions of vehicles are also increasing accordingly, and these functions are enabled or disabled by switch buttons. Switch buttons commonly used in vehicles are classified into two types: one type being touch switch buttons, and the other type being mechanical switch buttons. Mechanical switch buttons are very mature, but can provide only limited functions, and therefore cannot be used in high-end intelligent vehicles. Touch switch buttons typically need to be used together with a component that prevents unintentional touches, so as to prevent an unintentional operation.

In addition, a horn assembly is also mounted in vehicles. While a vehicle is traveling, a driver may enable the horn assembly as desired (e.g., in order to alert a pedestrian in front of the vehicle) to emit a sound signal. An operation of enabling the horn assembly is that the driver presses the steering wheel to move a safety airbag device downwards to close a circuit of the horn assembly, so as to emit a sound signal.

Since buttons and the horn assembly are all provided on the steering wheel, the steering wheel needs to have sufficient accommodating space therefor. This results in limited space in the steering wheel for mounting remaining devices (e.g., a safety airbag), and therefore the steering wheel needs to be designed to be larger.

Therefore, it is desirable that the steering wheel has sufficient mounting space and is small.

SUMMARY

The objective of the present invention is to provide a small steering wheel having sufficient mounting space, and also to provide a method for enabling a preset function in a vehicle by using a steering wheel.

According to an aspect of the present invention, provided is a steering wheel, comprising a cover, a safety airbag, and a frame, the safety airbag being accommodated in a space defined by the cover and the frame and being fixedly mounted on the frame, and the cover being connected to the frame in a suspended manner,
wherein,
the cover is a unitary structure, and is divided into a first functional region, a second functional region, and a third functional region, the second functional region being opposite the safety airbag, and surfaces of the first functional region and the third functional region being both provided with a touch film,
at least three non-collinear force sensors being further provided in the space, wherein some of the force sensors are arranged to be opposite the first functional region, and the rest of the force sensors are arranged to be opposite the third functional region, and
the steering wheel further comprising a controller, the controller acquiring a first parameter signal by means of the touch films, acquiring a force signal by means of the force sensors, and controlling the enabling of a corresponding function in the first functional region, the second functional region, and the third functional region on the basis of the first parameter signal and on the basis of a force application position and the magnitude of an applied force acquired according to the force signal.

According to an embodiment of the present invention, the first functional region and the third functional region are configured to be switch regions having electronic switches, and the second functional region is configured to be a horn region for enabling a horn function.

According to an embodiment of the present invention, the steering wheel further comprises a first support and a second support fixedly mounted on the frame, the cover being connected to the first support and the second support in a suspended manner, and the first support and the second support being respectively opposite the first functional region and the third functional region, and each having a force sensor and a controller mounted thereon.

According to an embodiment of the present invention, a bottom surface of a housing of the safety airbag is provided with a frame member, tabs being provided at edges of the frame member, and the tabs contacting a bottom surface of the cover to provide a pre-pressure for causing the cover to bulge outwards.

According to an embodiment of the present invention, the second functional region is provided between the first functional region and the third functional region, the cover comprising an intermediate side wall located in an intermediate position thereof, the intermediate side wall being provided with first window portions into which first hook-shaped portions of the housing are inserted, and an edge of each first window portion being covered with a first elastic member so that the first elastic member is located between the first hook-shaped portion and the first window portion.

According to an embodiment of the present invention, each of the first support and the second support comprises an upper support and a lower support, and the cover comprises edge side walls located on two sides of the intermediate side wall and respectively spaced apart from the intermediate side wall, the edge side walls each being provided with second window portions into which second hook-shaped portions of the upper support are inserted and third window portions into which third hook-shaped portions of the lower support are inserted, an edge of each second window portion being covered with a second elastic member so that the second elastic member is located between the second hook-shaped portion and the second window portion, and an edge of each third window portion being covered with a third elastic member so that the third elastic member is located between the third hook-shaped portion and the third window portion.

According to an embodiment of the present invention, the cover is further provided with, at the first functional region and the second functional region, an acoustic feedback module and/or a vibration feedback module when a corresponding function is enabled.

According to an embodiment of the present invention, the first functional region, the second functional region, and the third functional region of the cover define a strip region connected to a steering wheel rim of the steering wheel.

According to an embodiment of the present invention, the frame member is provided on the bottom surface of the housing of the safety airbag in an over-molded manner.

According to another aspect of the present invention, provided is a method for enabling a preset function in a vehicle by using the above-described steering wheel, wherein, the method comprises the following steps:

when a triggering condition is satisfied, measuring a first parameter by means of the touch films, measuring a force signal by means of the force sensors, and acquiring a force application position and the magnitude of an applied force on the basis of the force signal;

in the case that the measured first parameter is not less than a first touch threshold, when the magnitude of the applied force is greater than a first force threshold, enabling a function corresponding to the force application position;

and in the case that the measured first parameter is less than the first touch threshold, when the magnitude of the applied force is greater than a third force threshold and the force application position is in the third functional region, enabling a function corresponding to the third functional region.

According to an embodiment of the present invention, wherein in the case that the measured first parameter is not less than the first touch threshold, when the magnitude of the applied force is greater than the first force threshold, the function corresponding to the force application position is enabled, and acoustic feedback and/or vibration feedback is simultaneously provided.

According to an embodiment of the present invention, wherein in the case that the measured first parameter is not less than the first touch threshold, when the magnitude of the applied force is greater than the first force threshold, the function corresponding to the force application position is enabled, and acoustic feedback and/or vibration feedback is simultaneously provided; and then, in the case that the first parameter measured by means of the touch films is less than a second touch threshold, when the magnitude of the applied force is less than a second force threshold, acoustic feedback and/or vibration feedback is provided.

According to an embodiment of the present invention, the first parameter comprises one or a plurality among an application time, an application area, an application path, or the number of applications.

According to an embodiment of the present invention, the triggering condition comprises that an initialization step has been completed.

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where FIG. 1 schematically illustrates a steering wheel according to an embodiment of the present invention.

DETAILED DESCRIPTION

Specific implementations of a steering wheel and a method for enabling a preset function in a vehicle by using a steering wheel according to the present invention will be described below with reference to the accompanying drawings. The following detailed description and the accompanying drawings are used to illustratively explain the principles of the present invention. The present invention is not limited to the described preferred embodiments, and various embodiments described in the present invention can be used individually or in any combination. The scope of protection of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

Figure 1:
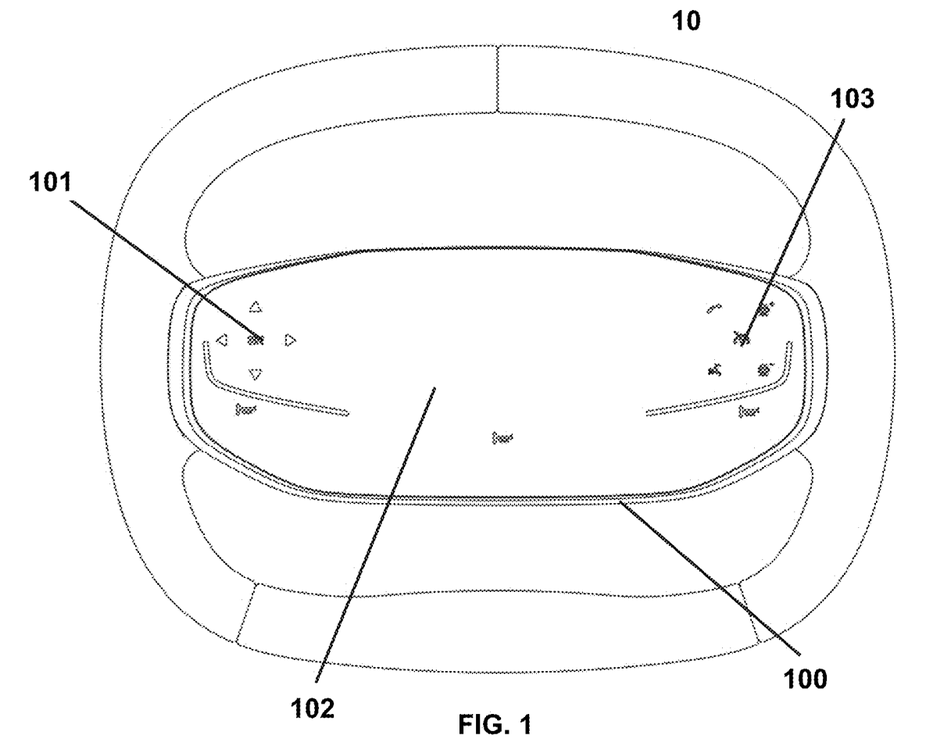
Figure 2:
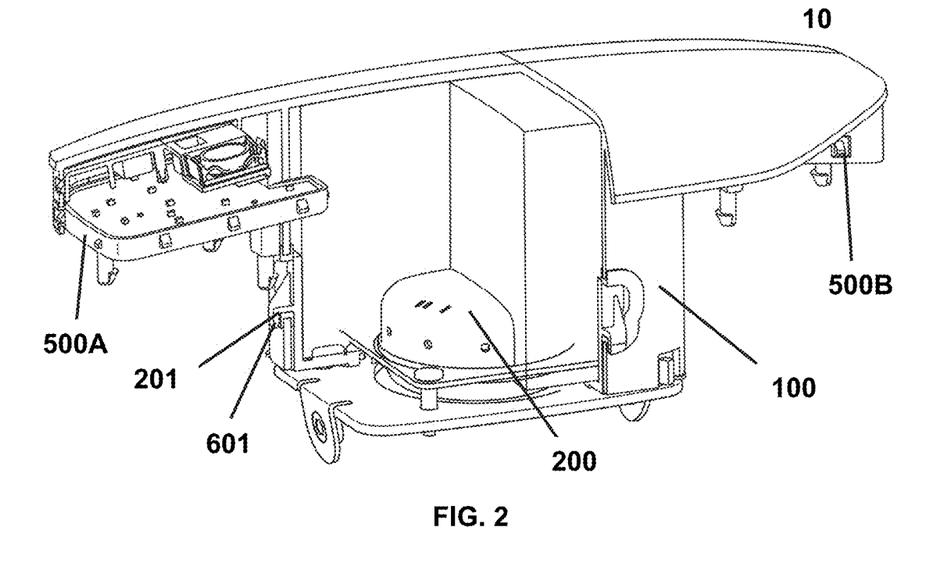
FIG. 2 schematically illustrates part of the structure of a steering wheel according to an embodiment of the present invention.
Figure 3:
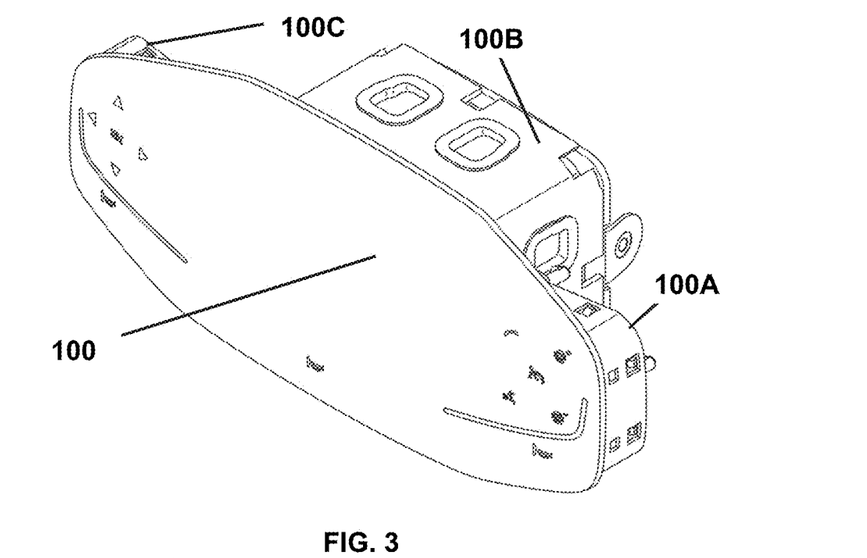
FIG. 3 schematically illustrates a cover in a steering wheel according to an embodiment of the present invention.

FIG. 1 schematically illustrates a steering wheel according to an embodiment of the present invention. FIG. 2 schematically illustrates part of the structure of a steering wheel according to an embodiment of the present invention. FIG. 3 schematically illustrates a cover in a steering wheel according to an embodiment of the present invention. The steering wheel according to the embodiment of the present invention is described below with reference to FIG. 1 to FIG. 3.

As shown in FIG. 1 to FIG. 3, a steering wheel 10 according to an embodiment of the present invention includes a cover 100, a safety airbag 200, and a frame (not shown in the drawings). The cover 100 and the frame define a space. The safety airbag 200 is accommodated in the space defined by the cover 100 and the frame, and the safety airbag 200 is fixedly mounted on the frame. It can be understood that the safety airbag 200 may be fixedly mounted on the frame by using any known fixation method, and description is not further provided herein. The cover 100 in the steering wheel 10 according to the embodiment of the present invention is described below in detail.

As shown in FIG. 1 to FIG. 3, the cover 100 is a unitary structure. In particular, it can be clearly observed in FIG. 1 that on an upper side of the cover 100, i.e., the side that can be seen by a driver after the steering wheel 10 is mounted in a vehicle, a front surface of the cover 100 is a complete surface. In addition, in the steering wheel 10 of the present invention, the cover 100, particularly the front surface of the cover 100, is divided into a first functional region 101, a second functional region 102, and a third functional region 103, and the second functional region 102 is located between the first functional region 101 and the third functional region 103 and is opposite the safety airbag 200. It should be noted that because the safety airbag 200 is accommodated in the space defined by the cover 100 and the frame, it can be understood that the second functional region 102 being opposite the safety airbag 200 means that the second functional region 102 and the safety airbag 200 are opposite each other in the thickness direction of the steering wheel 10.

As an example, the first functional region 101 and the third functional region 103 are configured to be switch regions having electronic switches, and the second functional region 102 is configured to be a horn region for enabling a horn function. The electronic switches include, for example, a switch for enabling/disabling a multimedia function, a switch for adjusting multimedia volume, a switch for answering/hanging up a phone, a switch for enabling/disabling automatic cruise, a switch for turning to the previous/next page, and so on. Certainly, the above definitions of the functional regions are merely examples, and specific functions of the first functional region, the second functional region, and the third functional region may be configured differently according to requirements. For example, the three functional regions are all configured to be switch regions having electronic switches. In addition, as an example of the present invention, as shown in FIG. 1, the first functional region 101, the second functional region 102, and the third functional region 103 of the cover 100 define a strip region connected to a steering wheel rim of the steering wheel 10.

As shown in FIG. 2, the cover 100 includes an intermediate side wall 100B located in an intermediate position thereof and edge side walls 100A and 100C located on two sides of the intermediate side wall 100B and respectively spaced apart from the intermediate side wall 100B. The intermediate side wall 100B and the edge side walls 100A and 100C are each provided with a plurality of window portions so that the cover 100 is connected to the frame in a suspended manner. This will be described below in detail with reference to FIG. 4.

Figure 4:
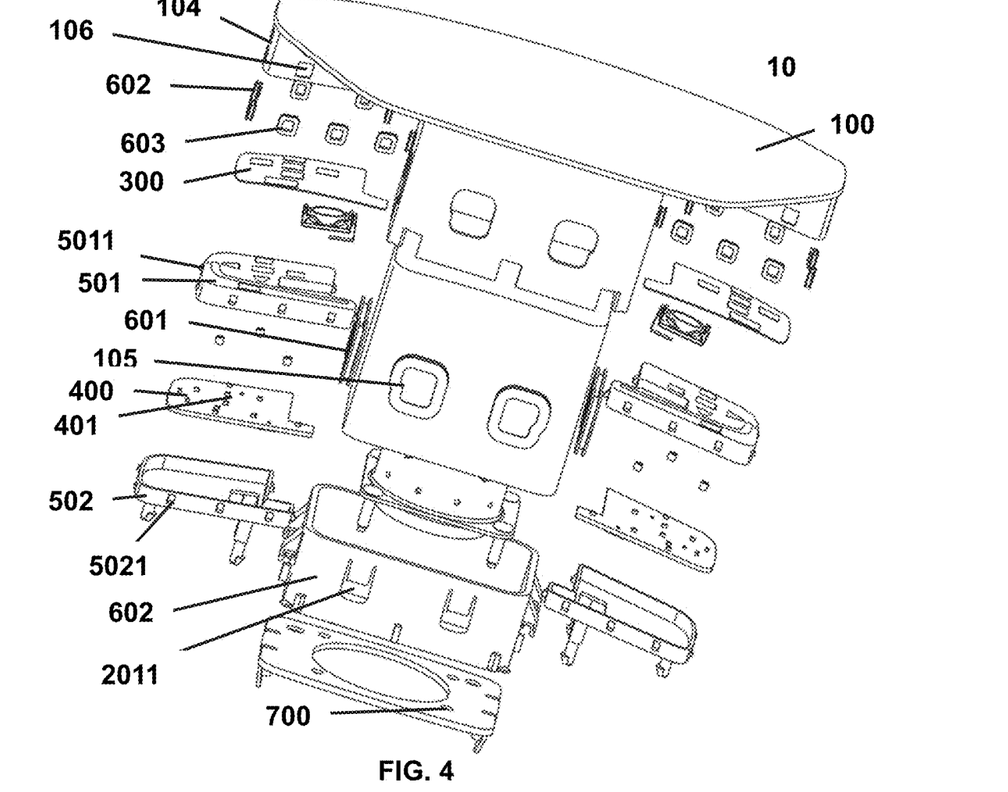
FIG. 4 schematically illustrates an exploded view of a steering wheel according to an embodiment of the present invention.

FIG. 4 schematically illustrates an exploded view of a steering wheel according to an embodiment of the present invention. The steering wheel according to the embodiment of the present invention is further described below with reference to FIG. 4.

As shown in FIG. 4, for ease of description of the steering wheel 10 according to the embodiment of the present invention, the structure of the steering wheel 10 is illustrated in the form of an exploded view. The steering wheel 10 includes the cover 100 and the safety airbag 200 that have been described above. A touch film 300 is provided on surfaces (specifically, inner side surfaces) of the first functional region 101 and the third functional region 103. The touch films 300 are used for detecting a touch action on the front surface of the cover 100. In the present embodiment, no touch film is provided at the second functional region 102 of the cover 100 opposite the safety airbag 200, and the main reason is that considering that the second functional region 102 is opposite the safety airbag 200, a great impact on the cover 100 is incurred at the second functional region 102 when the safety airbag 200 is inflated. If the second functional region 102 is provided with a touch film, the touch film would be extremely prone to being damaged by the impact, and therefore would have the disadvantage of having a short service life.

Moreover, six non-collinear force sensors 401 are further provided in the space defined by the cover 100 and the frame. The force sensors 401 are mounted on a printed circuit board 400. Three of the force sensors 401 are arranged to be opposite the first functional region 101, and the other three force sensors 401 are arranged to be opposite the third functional region 103. The force sensors 401 are for measuring a force applied to the surface (specifically the front surface) of the cover 100.

It should be noted that although a total of six force sensors are provided in the embodiment of the present invention, this is merely an example. In effect, in the steering wheel of the present invention, it is only necessary that at least three non-collinear force sensors are provided. Some of the three force sensors are arranged to be opposite the first functional region 101, and the other force sensors are arranged to be opposite the third functional region, a principle thereof being that three non-collinear force sensors can determine one measurement plane. The measurement plane can be understood to be the front surface of the cover 100. Therefore, the three non-collinear force sensors can measure a force applied to the measurement plane. Of course, considering requirements such as measurement precision, etc., more than three force sensors may be provided.

Moreover, the steering wheel 10 of the present invention further includes a controller (not shown). The controller may likewise be mounted on the printed circuit board 400. The controller acquires a signal of a first parameter (e.g., capacitance) by means of the touch films 300, acquires a force signal by means of the force sensors 401, and controls the enabling of a corresponding function in the first functional region 101, the second functional region 102, and the third functional region 103 on the basis of the first parameter signal and on the basis of a force application position and magnitude of an applied force acquired according to the force signal.

It can be understood that when a hand approaches the front surface of the cover 100, the controller can detect a change in the first parameter (e.g., the capacitance, or a parameter related to the capacitance, such as voltage, current, or the like) of the touch films 300. The principle of measurement of the force sensors 401 in the steering wheel 10 of the present invention will be described below in detail with reference to FIG. 6.

Figure 6:
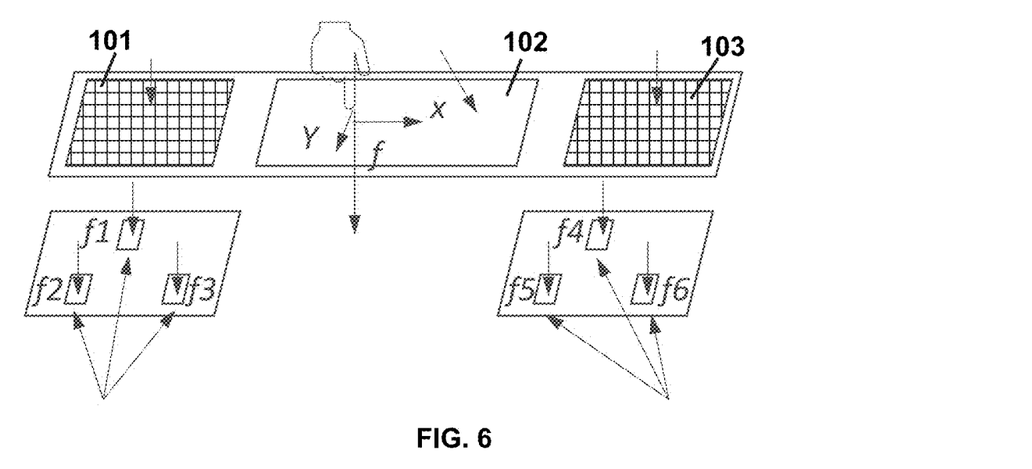
FIG. 6 schematically illustrates a principle of measurement of a force application position and the magnitude of an applied force performed by force sensors in a steering wheel according to an embodiment of the present invention.

FIG. 6 illustrates the principle of measurement of a force application position and the magnitude of an applied force performed by the force sensors 401 in the steering wheel 10 illustrated in FIG. 4. As shown in FIG. 6, when the hand applies a force at the second functional region 102 of the cover 10, the entire front surface of the cover 10 deforms slightly. Therefore, the three force sensors 401 located in the first functional region 101 respectively measure forces $f1$, $f2$, and $f3$ received in positions thereof. Likewise, the three force sensors 401 located in the third functional region 103 respectively measure forces $f4$, $f5$, and $f6$ received in positions thereof. The controller can acquire the magnitude of the force applied by the hand and the force application position on the basis of $f1$, $f2$, $f3$, $f4$, $f5$, and $f6$. The principle of measurement of a force application position and the magnitude of an applied force performed by the force sensors in the steering wheel of the present invention is, for example, based on a calibration method. Specifically, in experiments, different forces are applied to different positions on the front surface of the cover to acquire the magnitudes of the forces measured by six force sensors in corresponding cases. Therefore, a one-to-one correspondence between applications of different forces to different positions on the cover and the magnitudes of the forces measured by the six force sensors is established. Therefore, in actual use of the steering wheel, on the basis of data that has been established by the calibration method, the position to which a force is applied by the hand and the magnitude of the applied force can be acquired by measuring the magnitudes of forces measured by the six force sensors.

On that basis, the controller controls the enabling of a corresponding function in the first functional region 101, the second functional region 102, and the third functional region 103 on the basis of the first parameter signal and on the basis of a force application position and the magnitude of an applied force.

As shown in FIG. 2, according to an embodiment of the present invention, the steering wheel 10 further includes a first support 500A and a second support 500B. The two supports are fixedly mounted on the frame, and are respectively opposite the first functional region 101 and the third functional region 103. The first support 500A and the second support 500B each have a mounting space, and each have a force sensor 401 and a controller mounted thereon. Of course, other electronic elements may also be mounted in the respective mounting spaces of the first support 500A and the second support 500B.

As an example, the first support 500A and the second support 500B are configured to be identical to each other, and therefore, connection of only one of the first support 500A and the second support 500B to the cover 100 is described in detail with reference to FIG. 4. As shown in FIG. 4, each of the first support and the second support includes an upper support 501 and a lower support 502, and the edge side walls 100A and 100C (shown in FIG. 3) are respectively provided with second window portions 104 into which second hook-shaped portions 5011 of the upper support 501 are inserted and third window portions 106 into which third hook-shaped portions 5021 of the lower support 502 are inserted. An edge of each second window portion 104 is covered with a second elastic member 602 so that the second elastic member 602 is located between the second hook-shaped portion 5011 and the second window portion 104 when the upper support 501 is connected to the cover 100. An edge of each third window portion 106 is covered with a third elastic member 603 so that the third elastic member 603 is located between the third hook-shaped portion 5021 and the third window portion 106 when the lower support 502 is connected to the cover 100. Moreover, the safety airbag 200 is connected to the cover 100 by using similar means. Specifically, as shown in FIG. 4, the intermediate side wall 100A (shown in FIG. 3) is provided with first window portions 105 into which first hook-shaped portions 2011 of a housing of the safety airbag 200 are inserted, and an edge of each first window portion 105 is covered with a first elastic member 601, so that the first elastic member 601 is located between the first hook-shaped portion 2011 and the first window portion 105 when the housing of the safety airbag 200 is connected to the cover 100. It can be understood that when an elastic connection member is provided between corresponding window and hook-shaped portions, the elastic connection member allows a certain amount of relative movement between the two connected members. Therefore, the cover 100 is connected to the first support 500A, the second support 500B, and the safety airbag 200 in a suspended manner. As the first support 500A, the second support 500B, and the safety airbag 200 are fixedly mounted on the frame, the cover 100 is connected to the frame in a suspended manner. Such a suspension manner is particularly beneficial for reducing noise and configuring vibration feedback of enabling of a corresponding function as mentioned below.

Moreover, a mounting plate 700 is mounted at a bottom surface of the housing of the safety airbag 200, and the safety airbag 200 is fixedly mounted on the frame of the steering wheel 10 by means of the mounting plate 700. In this way, the cover 100 is connected to the first support 500A, the second support 500B, the safety airbag 200, and the mounting plate 700 in a suspended manner, and is connected to the frame in a suspended manner by means of the foregoing members.

According to an embodiment of the present invention, the cover may further be provided with, at the first functional region and the second functional region, an acoustic feedback module and/or a vibration feedback module when a corresponding function is enabled.

Figure 5A:
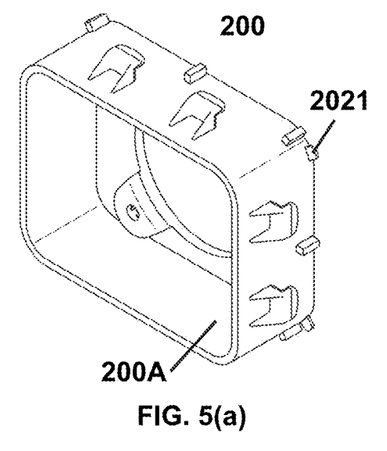
FIG. 5(a) and FIG. 5(b) schematically illustrate a safety airbag in a steering wheel according to an embodiment of the present invention.
Figure 5B:
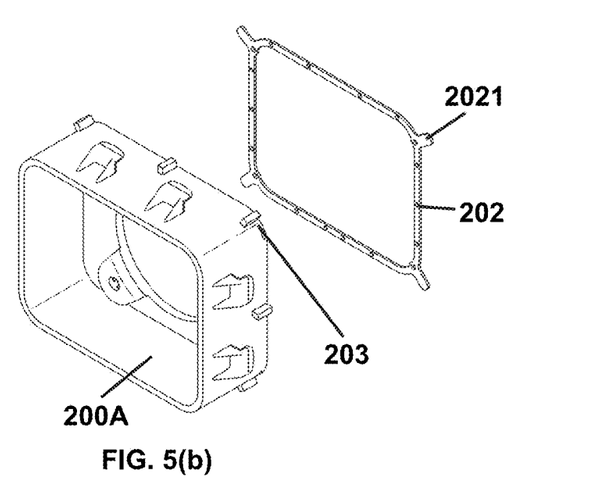

FIG. 5($a$) and FIG. 5($b$) schematically illustrate a safety airbag in a steering wheel according to an embodiment of the present invention. FIG. 5($a$) is a schematic diagram of the housing and a frame member 202 of the safety airbag 200 that are mounted together, and FIG. 5($b$) is a schematic diagram of the housing and the frame member 202 of the safety airbag 200 that are separated.

As shown in FIG. 5($a$) and FIG. 5($b$), the bottom surface of the housing of the safety airbag 200 is provided with the frame member 202. Tabs 2021 are proved at edges of the frame member 202. When the frame member 202 is mounted on the bottom surface of the housing of the safety airbag 200 (for example, the frame member 202 is provided on the housing of the safety airbag 200 in an over-molded manner), each tab 2021 of the frame member 202 protrudes from a slot 203 of a side wall 200A of the housing of the safety airbag 200. A portion of each tab 2021 protruding from the slot 203 contacts a bottom surface of the cover 100 to provide a pre-pressure for causing the cover 100 to bulge outwards. The pre-pressure causes the front surface of the cover 100 of the steering wheel 10 to have a curved shape. The front surface of the cover 100 has a curved shape, so that in the case that the driver applies a force to the front surface of the cover 100 in order to enable a corresponding function, the applied force can easily incur a certain amount of deformation of the front surface of the cover 100, thereby ensuring that the applied force is reliably measured. It should be noted that the material of the frame member does not need to be limited. For example, optionally, the frame member may be made from an insulating material.

Therefore, in the steering wheel of the present invention, the controller enables a plurality of different functions on the basis of the touch films and the force sensors. Therefore, the steering wheel has few parts, has sufficient mounting space, and is small.

Also provided in the present invention is a method for enabling a preset function in a vehicle by using the above-described steering wheel. This will be described below in detail with reference to FIG. 7.

Figure 7:
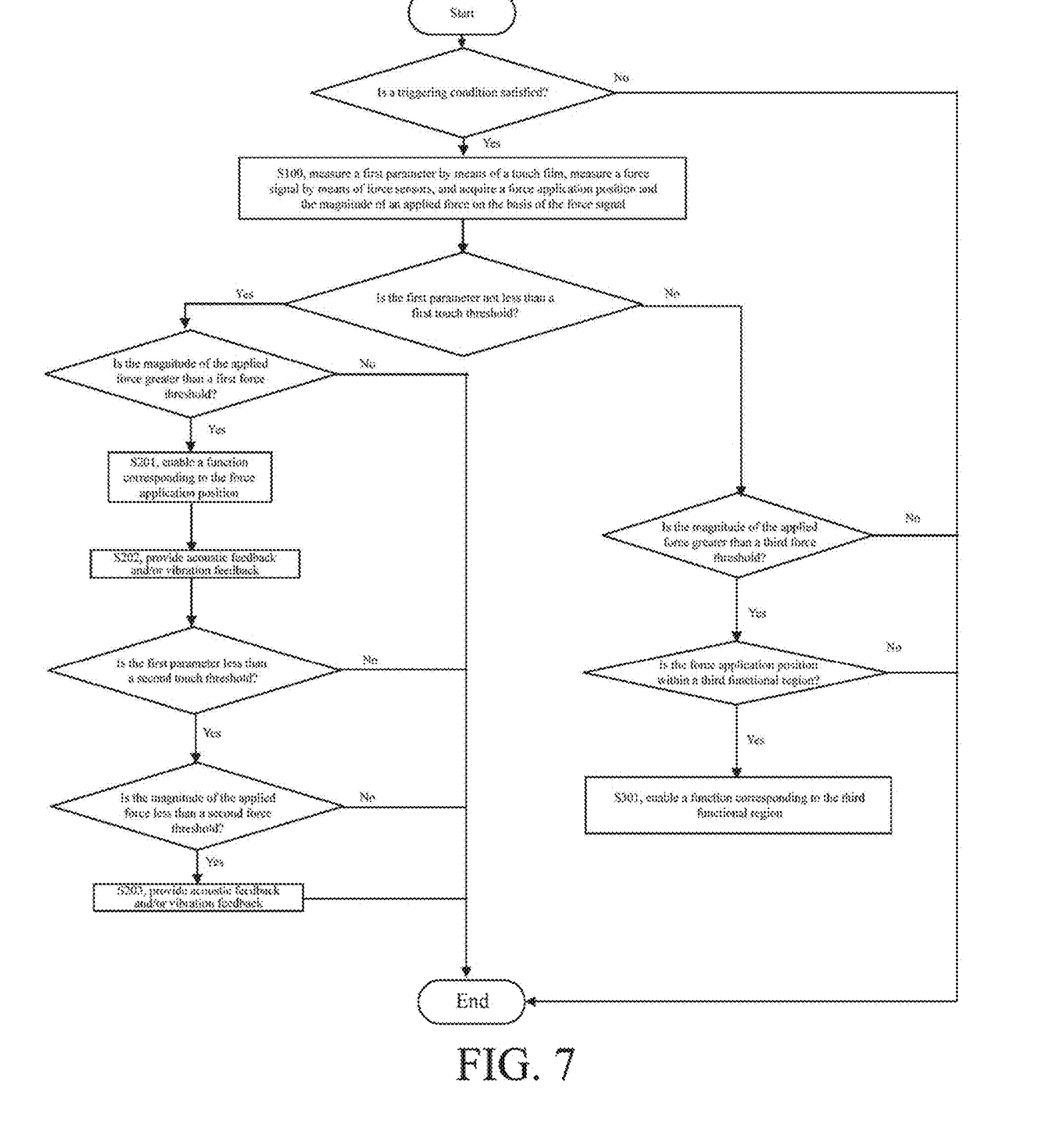
FIG. 7 schematically illustrates a flowchart of a method for enabling a preset function in a vehicle by using a steering wheel according to the present invention.

FIG. 7 schematically illustrates a flowchart of a method for enabling a preset function in a vehicle by using a steering wheel according to the present invention.

As shown in FIG. 7, when a triggering condition is satisfied, in S100, a first parameter is measured by means of the touch films 300, a force signal is measured by means of the force sensors 401, and a force application position and the magnitude of an applied force are acquired on the basis of the force signal.

Then, it is determined whether the first parameter is not less than a first touch threshold, if the determination result is yes, then it is further determined whether the magnitude of the applied force is greater than a first force threshold, and if so, in S201, a function corresponding to the force application position is enabled, and as an optional step, in S202, acoustic feedback and/or vibration feedback is provided;

as another optional step, it continues to be determined whether the first parameter measured by the touch films 300 is less than a second touch threshold and whether the magnitude of the applied force is less than a second force threshold, and if determination results are both yes, then in step S203, acoustic feedback and/or vibration feedback is provided. It should be noted that the magnitude relationship between the first touch threshold and the second touch threshold is not limited, and the magnitude relationship between the first force threshold and the second force threshold is not limited, the first touch threshold, the second touch threshold, the first force threshold, and the second force threshold being adjustable according to requirements of the feeling on the hands when being used; or if the determination result is no, then it continues to be determined whether the magnitude of the applied force is greater than a third force threshold, and if so, then it continues to be determined whether the force application position is within the third functional region, and if so, in S301, a function corresponding to the third functional region is enabled.

It should be noted that the above-described optional steps are for causing an electronic switch to provide the feeling of a mechanical switch, so that the driver has a more familiar and more pleasant experience during operation.

As an embodiment of the present invention, the first parameter includes one or a plurality among an application time, an application area, an application path, or the number of applications. It can be understood that the first parameter is provided to be combined with the first touch threshold to determine whether a touch is invalid, so as to prevent an unintentional touch from enabling a corresponding function in a position that is touched unintentionally. To help understand the method of the present invention, determination in the following scenarios of unintentional touches is provided.

For example, when the driver inadvertently touches the front surface of the cover of the steering wheel, the controller measures a change in the capacitance value caused by the action, determines, by means of comparison, that the change in the capacitance value is less than a set first touch threshold (a capacitance threshold), determines that the magnitude of an applied force is less than the third force threshold, and therefore determines that the operation of the driver is an unintentional operation, and thus no function is enabled.

As another example, if an application time of an action of the driver is less than the set first touch threshold (a time threshold), and if it is determined that the magnitude of an applied force is less than the third force threshold, then it is determined that the action of the driver is invalid, and thus no function is enabled.

As another example, if an application path of an action of the driver is less than the set first touch threshold (i.e., a preset application path is not completely covered), and if it is determined that the magnitude of an applied force is less than the third force threshold, it is determined that the action of the driver is invalid, and thus no operation is started.

As another example, if the number of applications of an action of the driver is less than the set first touch threshold (a count threshold), and if it is determined that the magnitude of an applied force is less than the third force threshold, it is determined that the action of the driver is invalid, and thus no function is enabled.

As an embodiment of the present invention, the triggering condition includes that an initialization step has been completed. Certainly, the initialization step may be configured differently according to actual circumstances.

It should be noted that the advantages described above with reference to the steering wheel of the present invention are equally applicable to the method of the present invention, and therefore details will not be described herein again.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A steering wheel, comprising a cover and a safety airbag, the safety airbag being accommodated in a space defined at least in part by the cover, wherein, the cover is a unitary structure, and is divided into a first functional region, a second functional region, and a third functional region, the second functional region being opposite the safety airbag, and surfaces of the first functional region and the third functional region being both provided with a touch film, at least three non-collinear force sensors being further provided in the space, wherein some of the force sensors are arranged to be opposite the first functional region, and the rest of the force sensors are arranged to be opposite the third functional region, and the steering wheel configured to acquire a first parameter signal by means of the touch films, acquiring a force signal by means of the force sensors, and controlling the enabling of a corresponding function in the first functional region, the second functional region, and the third functional region, wherein the corresponding function in the first and third functional regions are controlled on the basis of the first parameter signal and on the basis of a force application position and the magnitude of an applied force acquired according to the force signal, and wherein the second functional region is configured to be a horn region for enabling a horn function, wherein the steering wheel further comprises a first support and a second support, the cover being connected to the first support and the second support in a suspended manner, and the first support and the second support being respectively opposite the first functional region and the third functional region, and each having a force sensor mounted thereon, wherein a bottom surface of a housing of the safety airbag is provided with a frame member, tabs being provided at edges of the frame member, and the tabs contacting a bottom surface of the cover to provide a pre-pressure for causing the cover to bulge outwards, and wherein the second functional region is provided between the first functional region and the third functional region, the cover comprising an intermediate side wall located in an intermediate position thereof, the intermediate side wall being provided with first window portions into which first hook-shaped portions of the housing are inserted, and an edge of each first window portion being covered with a first elastic member so that the first elastic member is located between the first hook-shaped portion and the first window portion.

2. The steering wheel according to claim 1, wherein the first functional region and the third functional region are configured to be switch regions having electronic switches.

3. The steering wheel according to claim 1, wherein each of the first support and the second support comprises an upper support and a lower support, and the cover comprises edge side walls located on two sides of the intermediate side wall and respectively spaced apart from the intermediate side wall, the edge side walls each being provided with second window portions into which second hook-shaped portions of the upper support are inserted and third window portions into which third hook-shaped portions of the lower support are inserted, an edge of each second window portion being covered with a second elastic member so that the second elastic member is located between the second hook-shaped portion and the second window portion, and an edge of each third window portion being covered with a third elastic member so that the third elastic member is located between the third hook-shaped portion and the third window portion.

4. The steering wheel according to claim 1, wherein the cover is further provided with, at the first functional region and the second functional region, an acoustic feedback module and/or a vibration feedback module when a corresponding function is enabled.

5. The steering wheel according to claim 1, wherein the first functional region, the second functional region, and the third functional region of the cover define a strip region connected to a steering wheel rim of the steering wheel.

6. The steering wheel according to claim 1, wherein the frame member is provided on the bottom surface of the housing of the safety airbag in an over-molded manner.

7. A method for enabling a preset function in a vehicle by using the steering wheel according to claim 1,
wherein, the method comprises the following steps:
when a triggering condition is satisfied, measuring a first parameter by means of the touch films, measuring a force signal by means of the force sensors, and acquiring a force application position and the magnitude of an applied force on the basis of the force signal;
in the case that the measured first parameter is not less than a first touch threshold,
when the magnitude of the applied force is greater than a first force threshold, enabling a function corresponding to the force application position;
and in the case that the measured first parameter is less than the first touch threshold,
when the magnitude of the applied force is greater than a third force threshold and the force application position is in the third functional region, enabling a function corresponding to the third functional region.

8. The method according to claim 7, wherein
in the case that the measured first parameter is not less than the first touch threshold,
when the magnitude of the applied force is greater than the first force threshold, the function corresponding to the force application position is enabled, and acoustic feedback and/or vibration feedback is simultaneously provided.

9. The method according to claim 7, wherein
in the case that the measured first parameter is not less than the first touch threshold,
when the magnitude of the applied force is greater than the first force threshold, the function corresponding to the force application position is enabled, and acoustic feedback and/or vibration feedback is simultaneously provided; and then,
in the case that the first parameter measured by means of the touch films is less than a second touch threshold,
when the magnitude of the applied force is less than a second force threshold, acoustic feedback and/or vibration feedback is provided,
wherein the first touch threshold is greater than the second touch threshold, and the first force threshold is greater than the second force threshold.

10. The method according to claim 7, wherein the first parameter comprises one or a plurality among an application time, an application area, an application path, and the number of applications.

11. The method according to claim 7, wherein the triggering condition comprises that an initialization step has been completed.

* * * * *